Jan. 19, 1965   M. PANZER   3,166,337
VEHICLE SUSPENSION
Filed Aug. 17, 1961
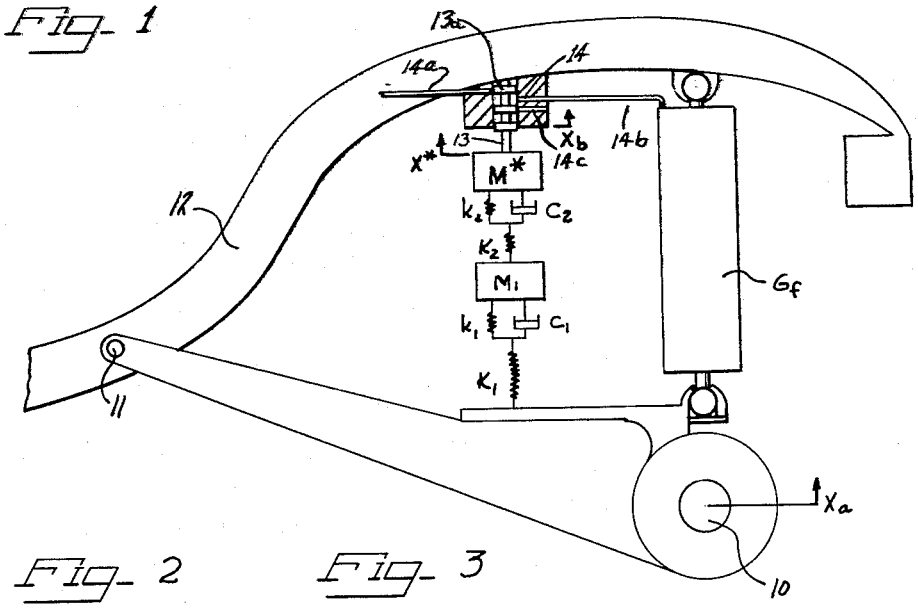
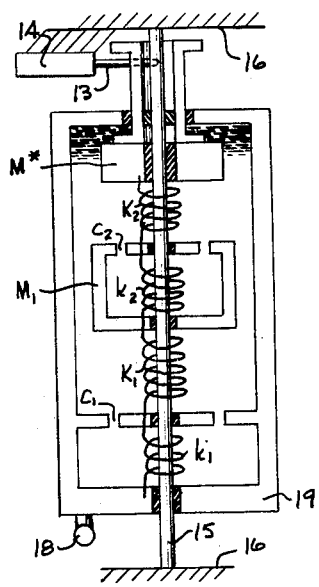
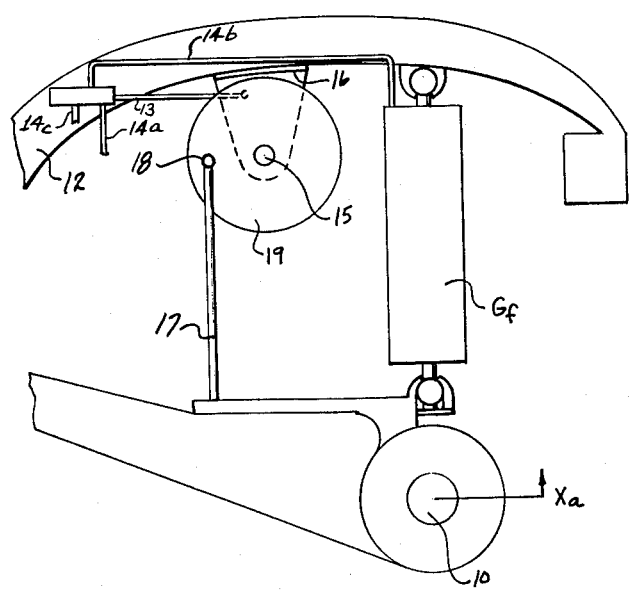
Inventor
Marvin Panzer United States Patent Office 3,166,337
Patented Jan. 19, 1965

3,166,337
VEHICLE SUSPENSION
Marvin Panzer, Staten Island, N.Y., assignor to Thompson Ramo Wooldridge Inc., Cleveland, Ohio, a corporation of Ohio
Filed Aug. 17, 1961, Ser. No. 132,218
6 Claims. (Cl. 280—6.1)

The present invention relates to automotive vehicles and, more particularly, is concerned with the provision of an improved vehicle suspension providing an extremely high rate of attenuation of high frequency vibrations at the axle to provide protection against high frequency road shocks reaching the body of the vehicle.

As those skilled in the field of automotive suspension construction are aware, a great many factors must be considered in the construction of a vehicle suspension system. So far as applicant is aware, no vehicle suspension system yet manufactured commercially has been capable of providing completely satisfactory suspension characteristics under all driving conditions and for all personal tastes. This is true since road characteristics vary over a wide range. However, with improvements in roads it has become increasingly desirable to provide a soft ride characteristic in modern day vehicles. In other words, it is desired that the vehicle be isolated as much as possible from the road and, hence, from the vehicle wheels which form the direct contact between the vehicle and the road.

It has been found that isolation of the vehicle from road bumps of the relatively low frequency type is best accomplished by very soft vehicle springs, of a low spring rate, positioned between the vehicle frame and the wheel and providing a low natural frequency of the vehicle frame and suspension on the order of one cycle per second or less. Due to the use of relatively stiff shock absorbers, however, high frequency vibrations at the axle are transmitted from the axle to the vehicle frame causing discomfort to the vehicle passengers when traveling over road surfaces having irregularities providing high frequency vibrations of the wheels. Although conventional viscous shock absorbers dampen low frequency vibrations adequately, my studies show that such suspension arrangements provide too great a band width or, in other words, permits too wide a range of rates of vibration to pass to the vehicle frame, and particularly fail to satisfactorily attenuate high frequency vibration at the vehicle wheel. Such conventional suspensions have a fixed rate of attenuation which is too slow to give adequate protection against high frequency road shocks and, accordingly, annoying high frequency vibration reaches the passenger in the vehicle.

Accordingly, the present invention is concerned with and, accomplishes, the provision of an improved suspension employing an independent shock absorber or filter coupled to each axle and employing a relatively small mass which responds generally in the manner desired of the vehicle body itself. This filter is constructed to provide a narrow band width and a very rapid attenuation. For example, it is preferred that the filter pass vibrations of approximately ¼ cycle per second or less and have an attenuation or cut-off rate of approximately —80 decibels per decade relative to higher frequencies. With such an arrangement the small mass will follow movement of the axle during very low frequency oscillations but will not follow the axle at frequencies below ¼ cycle per second. This movement characteristic of the small mass may then, if desired, be employed as the control for suspension position adjustment providing constant height of the vehicle with variation in vehicle load.

In accordance with the principles of the present invention, more specifically, a separate mass is secured to the vehicle axle for a single degree of freedom relative to the vehicle frame, and is acted upon by the axle through a series of springs and dampers providing a movement of the filter mass approximately in accordance with the desired movement of the vehicle frame or body and effectively absorbing and damping high frequency vibrations in the vehicle axle itself. More particularly, this is accomplished by connecting a mass, conveniently termed a filter or absorber mass, to the vehicle axle via a first spring connected in parallel with a viscous damper such as a dashpot and in series with a second spring in turn connected to a second mass which, likewise, is in turn connected to the axle via a spring in parallel with a second damper and in series with a further spring. By providing the springs of the filter with low natural frequencies, forces applied to the absorber mass result in movement of the mass only when axle movement is at a low frequency for example 15 cycles per minute or less. Vibrations of a frequency exceeding 15 cycles per minute are dynamically damped by the springs and dashpots of the filter and are attenuated at an extremely high rate preventing continued vibration inducing forces applied at the axle from reaching the vehicle body.

In accordance with the present invention, the main vehicle body suspension may comprise, for each wheel, an active hydraulic leveling strut and spring combined. Such suspensions are, of course, conventional in the vehicular art and the details of such form no part of the present invention. Suffice it to say, however, that the pneumatic and/or hydraulic forms of active, or adjustable, leveling suspensions shown in United States Letters Patent to Bell No. 2,150,156, Hughes No. 1,664,510, Messier No. 1,906,479, and others, are satisfactorily usable with the absorber system described herein to provide an improved suspension.

In those cases in which an active or adjustable leveling strut is provided, a filter mass or vibration absorber auxiliary mass above mentioned may be directly employed as the position-responsive member of the suspension leveling valve. As pointed out above, the auxiliary mass assumes the position desired for the vehicle frame in response to the application of vibration forces to the vehicle axle, and in so doing moves only upon the application of relatively slow movement of the axle. Thus, when operating the control valve, adjustments are made in the level of the strut only in response to low frequency movements of the axle which may, in most cases, be effectively considered a change in the steady state of the vehicle frame relative to the axle as a result of changes in vehicle load or the like.

It is, accordingly, an object of the present invention to provide an improved automotive vehicle suspension employing a low band width, rapid cut-off or attenuation independent mechanical dynamic filter, or vibration absorber, system.

Another object of the present invention is to provide an improved automotive vehicle suspension employing a low band width rapid attenuation filter employed for preventing high frequency vibrations of the vehicle axle from persisting and reaching the vehicle frame and for controlling the position of adjustable vehicle suspension struts.

Yet another object of the present invention is to provide an improved mechanical filter for vehicle suspensions.

Another object of the invention is to provide an improved automotive vehicle suspension filter which is relatively small in weight and size and capable of construction in a simple enclosed package or case, and which is not intended to bear or otherwise carry the load of the vehicle.

Yet other objects of the invention will at once be apparent from a consideration of the attached drawings wherein preferred forms of the invention are shown by way of illustration only and wherein:

FIGURE 1 is a diagrammatic view of an automotive suspension constructed in accordance with the present invention;

FIGURE 2 is a plan view of a modified form of filter construction; and

FIGURE 3 is a side-elevational view of the filter illustrated in FIGURE 2 as assembled into an automotive vehicle suspension.

As shown on the drawings:

In accordance with the present invention, and in the forms illustrated in the drawings herewith attached, a dynamic model filter is employed having a filter mass $M_1$ and an auxiliary mass $M^*$. Such an independent dynamic vibration filter or absorber is arranged to permit vertical movement only of the masses $M_1$ and $M^*$. The axle 10 is mounted for movement in a generally vertical direction about a pivot 11 on the frame 12, which frame is supported, as above noted, on a conventional support system $G_f$. Preferably, and in the arrangement illustrated, the support system $G_f$ is a conventional high gain hydropneumatic or pneumatic actuator having a very low spring rate and internal hydraulic damping, providing very great effective steady state stiffness between the axle and the frame. With such a pneumatic or hydropneumatic suspension the adjusted position of the frame 12 relative to the axle 10 has been controlled by a valve which is conventionally movable in response to variations in axle position. In the present invention, however, valve core 13, movable in housing 14 by rod 13a, is controlled by and forms part of the auxiliary mass $M^*$ of the vibration damping system. By providing the vibration damping system with an auxiliary mass $M^*$ vertically displaced in accordance with the desired movement of the frame in response to external forces sensed at the axle, the position of the core 13 relative to the frame mounted housing 14 provides a very satisfactory control for the pneumatic or hydropneumatic suspension strut $G_f$.

In the form shown, the core 13 is a conventional reciprocal strut control valve wherein in centered condition pressurized fluid is neither admitted to nor removed from the suspension strut and in upper or lower positions relative thereto, pressurized fluid is respectively admitted to the strut via conduits 14a, 14b from a conventional source of fluid under pressure (not shown) or removed from the strut via conduit 14b and vent (or conduit to sump) 14c to adjust the strut to return the valve core 13 to its centered position in a steady state condition.

As is clear, accordingly, the vertical movement of mass $M^*$ may be represented by a term $X^*$, the vertical movement of the frame 12 may be represented by the term $X_b$, and the vertical movement of the axle by the term $X_a$. In the steady state condition the position of the valve parts 13 and 14 is, as noted, centered to provide the desired adjusted position between the axle 10 and the frame 12. The independent dynamic vibration absorber is constructed to provide this control function in response to very slow movements of the axle 10. However, upon rapid movements of the axle 10 the auxiliary mass $N^*$ does not move directly in response to movements of the axle 10 but, as above noted, in accordance with the desired movement of the frame or body of the vehicle, thereby retaining its desired control function.

In the form illustrated, in which possible independent movement of the masses $M_1$, $M^*$ and axle 10 relative to one another provide three degrees of freedom, the system is of the sixth order or degree in the conventional terminology of vibration dampers employed by Den Hartog, for example, in his work. Mechanical, Vibrations, Fourth Edition, pages 90–135. Thus, employing springs $K_1$, $k_2$, $K_1$, and $k_2$, and damping forces $c_1$, and $C_2$ the transfer function, of forces from the axle 10 through to the auxiliary mass $M^*$ is $$\frac{X^*}{X_a}$$

which equals:

$$\frac{K_1 K_2 (c_1 S + k_1)(c_2 S + k_2)}{[m_1 c_1 S^3 + m_1 (k_1 + k_1) S^4 + k_1 (c_1 S + k_1)]} \times$$
$$[m_2 c_2 S^3 + m_2 (k_2 + k_2) S^4 + k_2 (c_2 S + k_2)]$$
$$+ m_2 S^4 (c_2 S + k_2)(c_1 S + k_1 + K_1) K_2$$

where S, as conventionally in Den Hartog, for example, is the "complex frequency." By tuning the vibration damper through the adjustment of the masses $M_1$ and $M^*$, and by selection of the damping forces $c_1$ and $c_2$ and the spring constants $K_1$, $k_1$, $K_2$ and $k_2$ to provide low natural frequency of the absorber with high damping within the absorber, a low bandwidth absorber with rapid attenuation of high frequency components is achieved. Movement of mass $M^*$ in response to deflection $X_a$ is then only permitted at frequencies below approximately 15 cycles per minute and is without significant high frequency oscillations. Accordingly, attachment of mass $M^*$ to the valve core 13 provides satisfactory control for the suspension system.

It is to be noted that ordinarily, vehicle suspensions for support of the body provide a natural frequency on the order of 60 cycles per minute. Accordingly, frequencies passed by the absorber above described are only a small fraction of the natural frequency of the main suspension. This relationship is desired for riding comfort. Further, it has been found that riding comfort is best achieved where the rate of damping of high frequency vibrations is high. In the present arrangement, the dampers $c_1$, $c_2$ in the system are chosen to provide a damping of the high frequencies applied to the axle and above the frequencies passed by the absorber, on the order of −80 decibels per decade as compared to −20 decibels per decade ordinarily employed in conventional systems in which the damping of high frequency axle vibration is provided only within the suspension $G_f$ between the axle 10 and frame 12.

A second form of dynamic vibration absorber providing a result equivalent to that accomplished by the form shown in FIGURE 1, may be seen in FIGURES 2 and 3. There, equivalent parts are identified by the same letter and subscript numerals in order to clarify the similarity in operation. As shown in FIGURES 2 and 3, the axle 10 is mounted for vertical movement relative to the frame 12 and is supported relative thereto by suspension $G_f$. However, the dynamic vibration absorber in the form shown in FIGURES 2 and 3 is carried by the frame by shaft 15 secured to the frame 12 on brackets 16. While the absorber is thus mounted on the frame, however, its vibration absorbing movement is completely independent of the frame and occurs in a rotational sense about the shaft 15.

As shown in FIGURES 2 and 3, vertical movement of the axle 10, indicated by displacement $X_a$ is applied to the vibration absorber via vertical link 17 and pivot joint 18 connected to housing 19. Thus, vertical movement of the link 17 oscillates the housing 19 in substantially the same manner as the axle 10 itself moves vertically up and down. This oscillation is transmitted to mass $M_1$ via spring $k_1$ and viscous damping connection $c_1$ acting in parallel, and spring $K_1$ serially positioned with respect therto. Again, movement of mass $M_1$ is correlated to $M^*$ via spring $k_2$ and viscous damper $c_2$ acting in parallel and sequentially through spring $K_2$ connected to mass $M^*$. The mass $M^*$ is freely rotatably mounted on the shaft 15 and the oscillations thereof, which are clearly independent of the supports 16 and the housing 19, may be employed to reciprocate a valve core 13 (not shown) via rod 13a slidably mounted in valve housing member 14 rigidly secured to the frame 12 or the fixed supports 16.

The form of the invention shown in FIGURES 2 and 3 is essentially equivalent in operation to that shown in FIGURE 1. It has a material advantage, however, in providing the viscous dampers $c_1$ and $c_2$ in an extremely compact manner. As shown, these dampers are completely enclosed within the outer housing 19 and are provided by the lubricating fluid which fills the housing 19. Further, while the oscillating motions of the various vibration absorber parts shown in FIGURES 2 and 3 are independent of the movement of the frame 12, nevertheless the vibration absorber is rigidly supported on the frame 12 in a manner protecting the components from extraneous impact forces. Although the sequence of the serially and paarllel mounted springs is reversed in the two forms, the result is the same in operation since the connection between the first mass $M_1$ and the driving member or axle is the same in both cases as is the connection between the auxiliary mass $M^*$ and the first mass $M_1$. This reversal of location is preferred for purposes of providing the outer housing 19 as a container for the viscous damping fluid and simultaneously permitting its utilization at $c_1$ as a part of the first viscous damper.

As those skilled in the art will recognize, the utilization of sequentially positioned springs $K_1$ and $k_1$ and $K_2$ and $k_2$ provides a natural frequency of the systems lower than the natural frequency that would be otherwise provided by a single spring having a spring constant of either the springs $K_1$ or $k_1$ or $K_2$ or $k_2$, respectively. This sequential arrangement of the springs mounting each of the masses $M_1$ and $M^*$ prevents the application of excessive damping forces since the springs $K_1$ and $K_2$ may give way quickly without causing excessive forces in the damping arrangements. The damping forces $c_1$ and $c_2$ are, accordingly, limited to values no greater than the forces applied at the springs $k_1$ and $k_2$, respectively providing a smooth and continuous action with the deflection of the springs $K_1$ and $K_2$. It will be understood, however, that within the scope of the present invention, a dynamic vibration absorber may be applied to the axle 10 and incorporate a mass $M_1$ coupled to the axle 10 via a spring $k_1$ and viscous damper $c_1$ arranged to provide absorption of the vibrations applied to axle 10 through the wheels of the vehicle. With such an arrangement it has been found that very satisfactory vibration absorbing is provided via the damping mechanism completely independent from the vehicle frame when the mass of the axle 10 equals approximately 100 lbs. per wheel and the mass of the damper $M_1$ approximates 20 lbs. and the natural frequency of the vibration absorber is at an optimum tuned in accordance with the formula $$F = \frac{1}{1+\mu}$$

where F=tuned frequency of the absorber and $$\mu = \frac{m}{M} = .2$$

Thus, while in the form of the invention shown in FIGURES 1, 2 and 3, the valve operation is accomplished by the position of the auxiliary mass $M^*$, such valve operation may be eliminated from the system, if desired, and vibration absorption alone be achieved in a desirable manner completely independently of the vehicle frame and the load carrying springs.

Achievement of vibration absorption without dependency on the vehicle frame is an important contribution in automotive suspension since no load of the vehicle is transmitted through the vibration absorber itself as in conventional suspension systems. Accordingly, although a relatively large number of springs and masses are employed in the systems illustrated in the present application, the components are not subjected to the vehicle loads directly and may, accordingly, be constructed in a compact, relatively lightweight manner. Further, the absorber can be constructed in a single enclosed package or container and may be employed with a large variety of conventional suspension springs $G_f$. Since variations in structure will be apparent to those in the art, it is intended that the scope of the invention be limited solely by that of the hereinafter appended claims.

I claim as my invention:

1. In combination in a suspension for an automotive vehicle, a vehicle body, an axle secured to said body for vertical movement with respect thereto and substantially limited to such vertical movement, resilient support means carrying said body above said axle and transferring the weight of the body to said axle, and dynamic vibration absorber means including a plurality of masses substantially smaller than the mass of said axle serially resiliently connected thereto and to each other independently of said frame for vertical movement only relative to said frame and said axle, each of said masses being connected to its respective support by way of a hydraulic damper and a first spring in parallel connection with each other.

2. In combination in a suspension for an automotive vehicle, a vehicle body, an axle secured to said body for vertical movement with respect thereto and substantially limited to such vertical movement, resilient support means carrying said body above said axle and transferring the weight of the body to said axle, and dynamic vibration absorber means including a plurality of masses substantially smaller than the mass of said axle serially resiliently connected to each other and to the axle independently of said frame for vertical movement only relative to said frame and said axle, each of said masses being connected to its respective support by way of a hydraulic damper and a first spring in parallel connection with each other and also by way of a spring in series with both said first spring and said hydraulic damper.

3. In combination in a suspension for an automotive vehicle, a vehicle body, an axle secured to said body for vertical movement only with respect thereto, resilient support means carrying said body above said axle and transferring the weight of the body to said axle, said resilient support means comprising a fluid spring adjustable by the introduction and release of fluid under pressure thereto, a dynamic vibration control means including a plurality of masses substantially smaller than the mass of said axle and serially resiliently connected thereto and to each other independently of said body for vertical movement only, each of said masses being connected to its respective supporting member via a hydraulic damper and a first spring in parallel connection with each other, and means securing a valve part to the one of said masses serially remote from said axle for co-operation with a second valve part secured to the body for controlling the flow of fluid under pressure to said resilient support means in response to movement of said one mass.

4. In combination in a suspension for an automotive vehicle comprising a vehicle frame, an axle secured to said frame for vertical movement with respect thereto, resilient fluid pressure support means carrying said frame above said axle and transferring therethrough the weight of said frame to said axle, dynamic vibration absorbing means including a plurality of masses resiliently connected to said axle for movement independently of said frame for absorbing vibration forces applied vertically to said axle, said last-named masses being each substantially smaller than the mass of said axle and serially resiliently interconnected thereto and to each other independently of said frame for movement by said axle, each of said masses being connected to its respective support member by way of a hydraulic damper and a first spring in parallel connection with each other.

5. In combination in a suspension for an automotive vehicle comprising a vehicle frame, an axle secured to said frame for vertical movement with respect thereto, resilient fluid pressure support means carrying said frame above said axle and transferring therethrough the weight of said frame to said axle, dynamic vibration absorbing means including a plurality of masses resiliently connected to said axle for movement independently of said frame for absorbing vibration forces applied vertically to said axle, said last-named masses being each substantially smaller than the mass of said axle and serially resiliently interconnected thereto and to each other for movement by said axle, each of said masses being connected to its respective drive member by way of a hydraulic damper and a first spring in parallel connection with each other and also via a spring in series with both said first spring and the hydraulic damper.

6. In combination in a suspension for an automotive vehicle comprising a vehicle frame, an axle secured to said frame for vertical movement with respect thereto, resilient fluid pressure support means carrying said frame above said axle and transferring therethrough the weight of said frame to said axle, dynamic vibration absorbing means including a plurality of masses resiliently connected to said axle for rotational movement independently of said frame to absorb vibration forces applied vertically to said axle, said last-named means being mounted on said frame and the said masses being substantially smaller than the mass of said axle and serially resiliently rotationally interconnected thereto and to each other for movement by said axle, each of said masses being connected to its respective drive member by way of a hydraulic damper and a first spring in parallel connection with each other and also via a spring in series with both said first spring and the hydraulic damper, all of said masses being enclosed in a single housing mounted for free rotation on said frame.

References Cited in the file of this patent
UNITED STATES PATENTS

| | | |
|---|---|---|
| 2,797,931 | Hans | July 2, 1957 |
| 2,865,651 | Chayne | Dec. 23, 1958 |
| 2,901,239 | Sethna | Aug. 25, 1959 |
| 3,038,739 | Vogel | June 12, 1962 |